(12) United States Patent
Bonnin Pons-Estel (10) Patent No.: US 11,081,816 B2
(45) Date of Patent: Aug. 3, 2021

(54) RAIL-MOUNTED BUILDING AUTOMATION DEVICE

(71) Applicant: ROBOT, S.A., Palma de Mallorca (ES)

(72) Inventor: Bernat Bonnin Pons-Estel, Palma de Mallorca (ES)

(73) Assignee: ROBOT, S.A., Palma de Mallorca (ES)

( * ) Notice: Subject to any disclaimer, the term of this patent is extended or adjusted under 35 U.S.C. 154(b) by 0 days.

(21) Appl. No.: 16/638,777

(22) PCT Filed: May 16, 2018

(86) PCT No.: PCT/ES2018/070359
§ 371 (c)(1),
(2) Date: Feb. 13, 2020

(87) PCT Pub. No.: WO2019/219988
PCT Pub. Date: Nov. 21, 2019

(65) Prior Publication Data
US 2021/0135383 A1 May 6, 2021

(51) Int. Cl.
*H01R 9/26* (2006.01)
*G05B 19/042* (2006.01)
*H04L 12/40* (2006.01)

(52) U.S. Cl.
CPC ......... *H01R 9/2675* (2013.01); *G05B 19/042* (2013.01); *H04L 12/40013* (2013.01);
(Continued)

(58) Field of Classification Search
None
See application file for complete search history.

(56) References Cited

U.S. PATENT DOCUMENTS 5,037,310 A * 8/1991 Marinello ................. G06F 1/18
439/61
5,041,704 A * 8/1991 Stenz ..................... H01H 1/365
200/6 R
(Continued)

FOREIGN PATENT DOCUMENTS

IT CS20100021 A1 6/2012
WO 2008097992 A1 8/2008
(Continued)

OTHER PUBLICATIONS

Jan. 31, 2019 (WO) International Search Report—App PCT/ES2018/070359.
(Continued)

*Primary Examiner* — Felix O Figueroa
(74) *Attorney, Agent, or Firm* — Banner & Witcoff, Ltd.

(57) ABSTRACT

The invention relates to a rail-mounted building automation device adaptable to space and communication requirements, comprising a communications module having a communications bus, an application module that implements the functionality. A bus connector supplies power and transferring data. The communications module includes a first casing having ten bus connector pins, a lower body with the communications bus, having a wall further forward than another in relation to a user. The application module includes a second casing with a pin-receiving connector having three terminals, a first projection separated from a second projection at approximately the width of the rail, in use when the ten pins are introduced into the receiving connector and an upper body of the first casing is introduced into a third recess of the second casing, with both being joined by a securing apparatus.

4 Claims, 7 Drawing Sheets

(52) U.S. Cl.
CPC ............ *G05B 2219/2614* (2013.01); *G05B 2219/2642* (2013.01); *G05B 2219/2664* (2013.01)

(56) References Cited

U.S. PATENT DOCUMENTS

| | | | |
|---|---|---|---|
| 5,775,955 A * | 7/1998 | Graube | H01R 9/2658 439/717 |
| 10,186,821 B2 * | 1/2019 | Muller | H01R 12/732 |
| 2008/0244104 A1 | 10/2008 | Clemente | |
| 2015/0244121 A1 | 8/2015 | Kmelio et al. | |
| 2016/0191268 A1 | 6/2016 | Diebel | |

FOREIGN PATENT DOCUMENTS

| | | |
|---|---|---|
| WO | 2009124217 A1 | 10/2009 |
| WO | 2015195202 A2 | 12/2015 |
| WO | 2016154461 A1 | 9/2016 |
| WO | 2016179320 A1 | 11/2016 |

OTHER PUBLICATIONS

Han Ning et al. "Research of KNX device node and development based on the bus interface module" Proceedings of the 29th Chinese Control Conference, Jul. 2010, pp. 4345-4350.
Jan. 21, 2021 (EP) Extended European Search Report—App. 18918963.2.

* cited by examiner

RAIL-MOUNTED BUILDING AUTOMATION DEVICE

The present application is a U.S. National Phase application under 35 U.S.C. § 371 of PCT/ES2018/070359 filed May 16, 2018, the contents therein of the applications is incorporated by reference herein in its entirety.

FIELD OF THE INVENTION

The present invention is encompassed in the field of building automation devices, such as for example those that control lighting, blinds, air conditioning, etc.

BACKGROUND OF THE INVENTION

Currently, the use of home automation and building management systems is being extended for building automation, which is done through devices with mainly electrical and electronic elements that allow the automation of certain tasks, such as lighting control, shutter control—such as the raising and lowering of blinds—the control of ambient air by means of air conditioning and heating appliances, surveillance, doorbells, etc. However, the implementation of this automation has led to the installation of many devices, which have a certain size and certain specific operating requirements, which sometimes makes them unfeasible due to their low ability to adapt to new communications, electrical and electronic requirements, like to certain relatively low-volume spaces, such as a low ceiling.

Patent WO2008/097992A1 is known which explains a building automation system with modular components, which in one embodiment are of the type of attachment to a standard rail with the aim of making the system more compact, avoiding the extensive use of wiring. Advantageously, each modular component can be of the same height and depth to be arranged laterally overlapping occupying the length of the rail, in which a power bus and a data bus can be arranged, either separately or combined. It is cited that any communication protocol can be used, specifically using a modular component intended for communications.

Patent US2008/0244104A1 is known, which explains a building automation system comprising a communications adapter with the various system devices, the adapter includes a fieldbus, can operate under several protocols. The schematic configuration of the adapter and device is explained, without reflecting a specific configuration.

Patent US2016/0191268A1 is known, which explains a building automation system with devices that include functional interchangeable modules, these are configured as portions insertable from the front of each device, some modules can be communications modules including different protocols. In the configurations shown, a fuse box and a light bulb socket are included.

DESCRIPTION OF THE INVENTION

The present invention is defined and characterised by the independent claims, while the dependent claims describe additional features thereof.

The subject matter of the invention is a rail-mounted building automation device that adapts to the different space and communications requirements. The technical problem to solve is to configure said device to reach the mentioned object.

In view of the foregoing, the present invention relates to a rail-mounted building automation device comprising a communication module (also called "MCU") having a communications bus of the device, being understood as with its exterior, either through wired or wireless network, an application module (also called "MAU") that implements the functionality of the device, i.e., it carries out the functions of the device, if it is a light switch, it will turn the lights on and off, etc., and a bus connector between the two modules, as is known in the state of the art.

The device is characterised in that the bus connector is at the same time for power supply and data transfer, the communication module comprising a first casing composed of an upper body with a first front wall and a first rear wall from which at least ten pins of the bus connector project, and a lower body with a second front wall that has a first recess in which the communications bus is inserted and a second rear wall, so that the first front wall is further forward than the second front wall with respect to a user, and the first rear wall is also further forward than the second rear wall with respect to the user, the application module comprising a second casing with a first projection comprising a second recess and a third recess with a third front wall from which a receiving connector for the bus connector pins projects, a fourth front wall that has a fourth centered recess that includes first electrical connection terminals, a fifth front wall that has a fifth centered recess and respective sixth and seventh recesses, these sixth and seventh recesses including second and third terminals respectively, at least a first protrusion facing a second projection, both projections being separated at approximately the width of the rail on which the device can be placed, in use when the ten pins of the bus connector are introduced in the receiving connector, the upper body is introduced in the third recess and the lower body in the fifth recess, and the first casing is joined to the second casing by securing means.

In this way, a compact device adaptable to any rail and also adaptable to any communications environment is achieved by simply placing the appropriate communications bus, i.e., that of the protocol necessary for the specific application. In this way a single MAU can be maintained for different applications in which the communication protocol changes, usually when changing countries, whereby only the MCU needs to be changed, with the economic and installation-related advantage that this implies. Likewise, this can be used for maintenance work in which a user does not have to be deprived of the device for a long period of time due to breakdown of the power stage or electrical maneuver, since merely the MAU is to be changed, which entails only a few seconds, avoiding bus reconnection and probably reconfiguration of the device.

Another added advantage is that it allows the development of the functionalities of the devices to be independent from that of communication, by having the MAU separated from the MCU, speeding up the development of new devices or the updating of existing ones.

Another advantage is that it allows the implementation of homogeneous multiprotocol solutions.

Another advantage is that in the updating of existing installations it allows the devices of the invention to be placed gradually, being able to coexist with old devices and even with those of different manufacturers.

"Rail" refers to the 35-mm DIN rail model, here named based on its relationship with the invention but without being part of it.

BRIEF DESCRIPTION OF THE DRAWINGS

The present specification is completed by a set of figures that illustrate a preferred embodiment and in no way limit the invention.

DETAILED DESCRIPTION OF THE INVENTION

Figure 1:
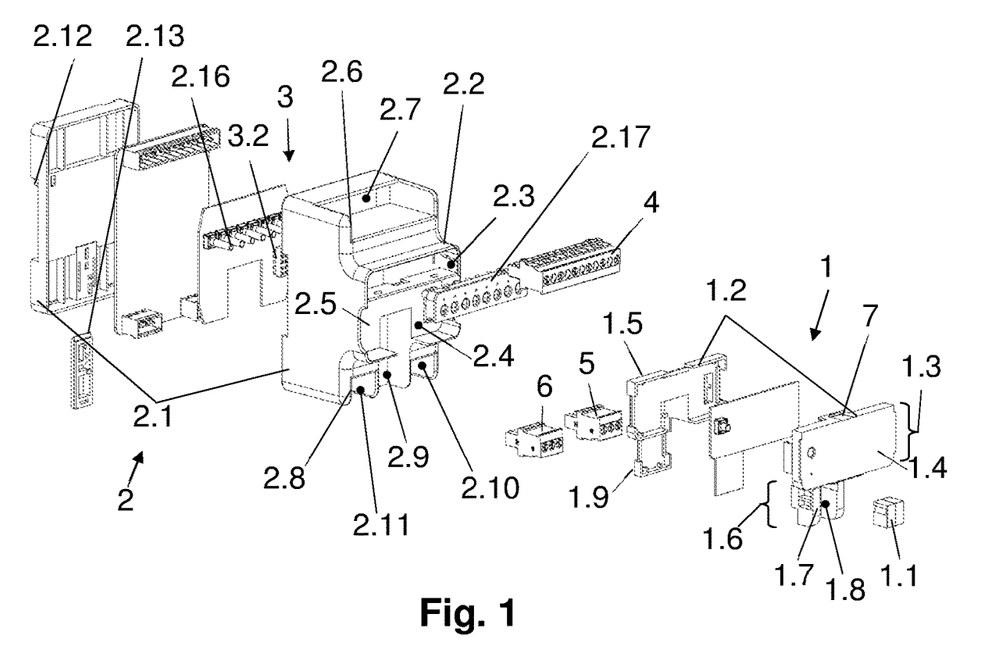
FIG. 1 represents an exploded perspective of the device.
Figure 2:
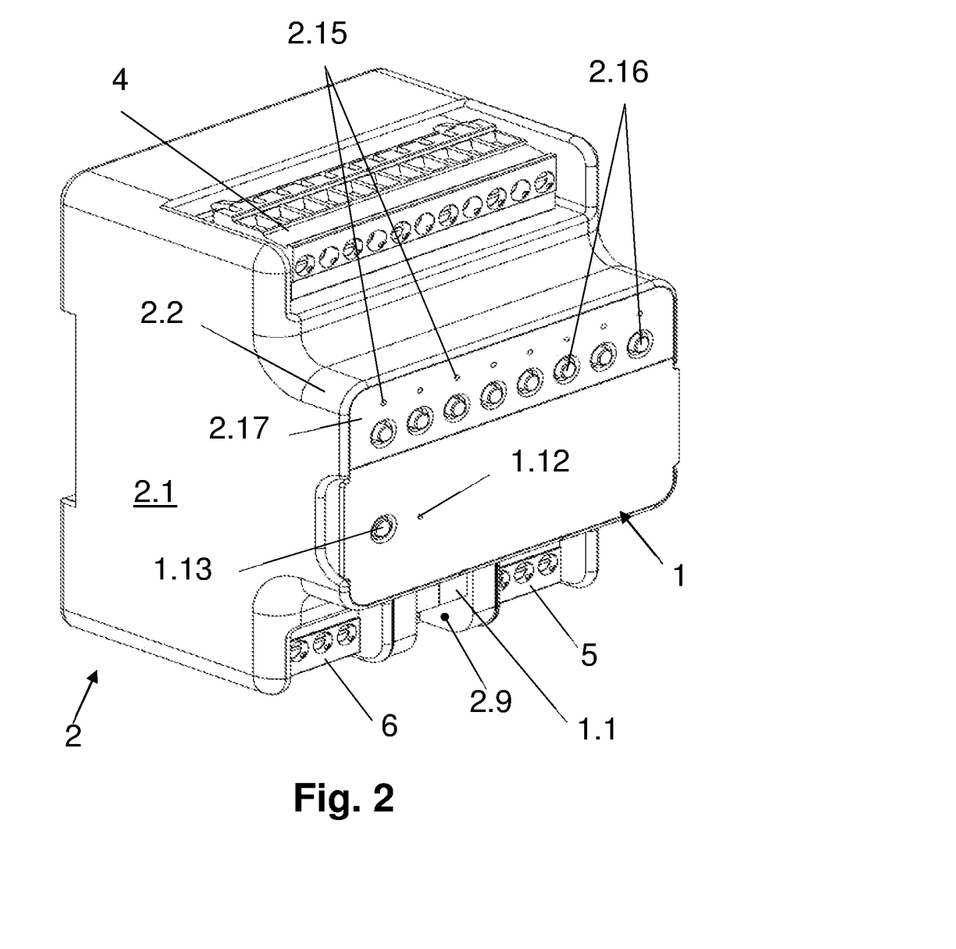
FIGS. 2 and 3 represent respective perspective views, front and rear respectively, of the closed device, in use.
Figure 3:
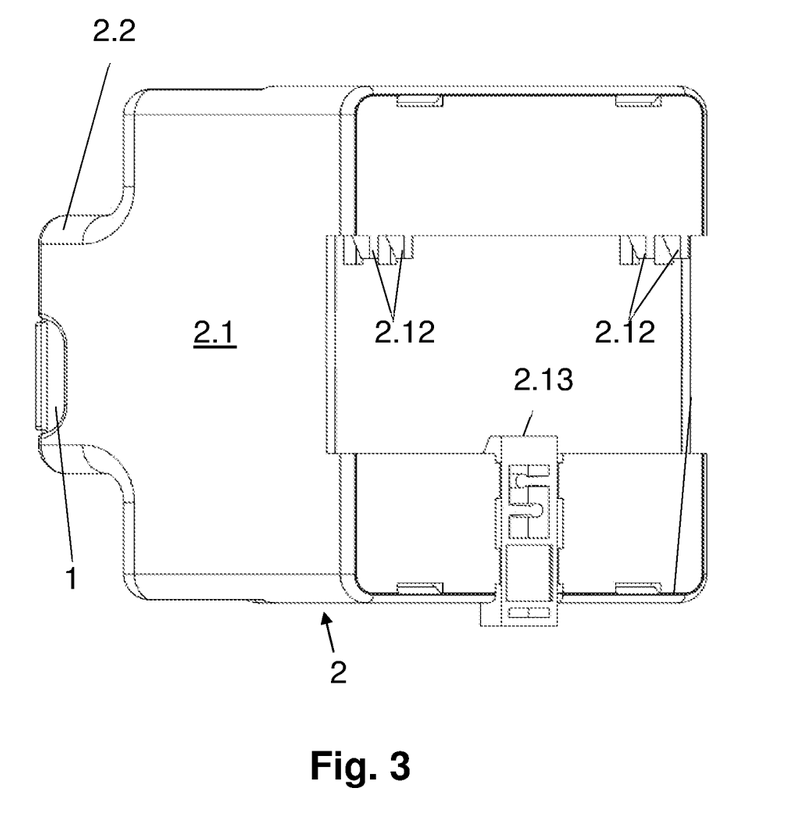

The present invention is a rail-mounted building automation device, shown in an exploded view in FIG. 1 and assembled or in use in FIGS. 2 and 3, comprising a communication module (1) with a communications bus (1.1) of the device, an application module (2) that implements the functionality of the device, and a bus connector (3) between the two modules (1, 2), the bus connector (3) being for power supply and data transfer.

Figure 4:
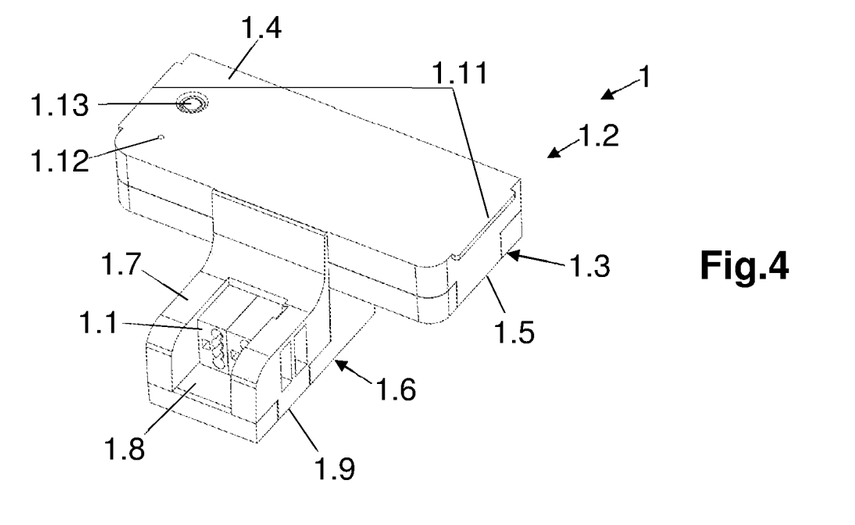
FIG. 4 represents a front perspective view of the first casing.
Figure 5:
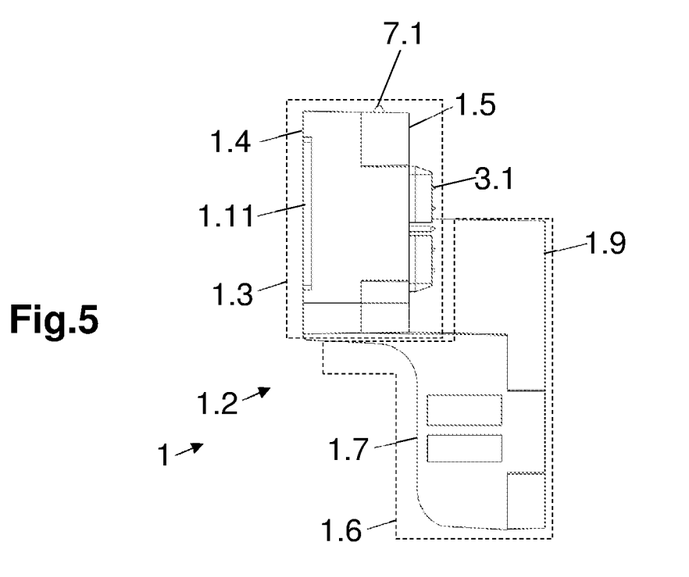
FIG. 5 represents a side view of the first casing.
Figure 6:
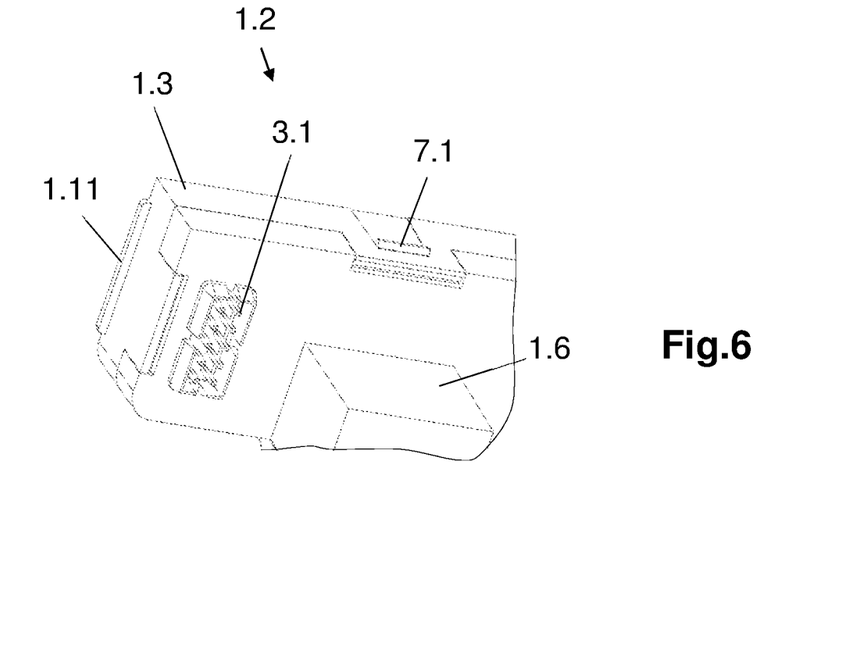
FIG. 6 represents a rear perspective view of the first casing.
Figure 10:
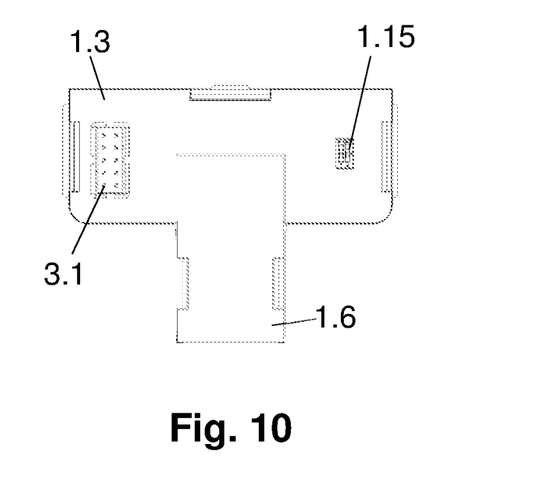
FIG. 10 is a rear view of the first casing of the embodiment of FIG. 9.
Figure 11:
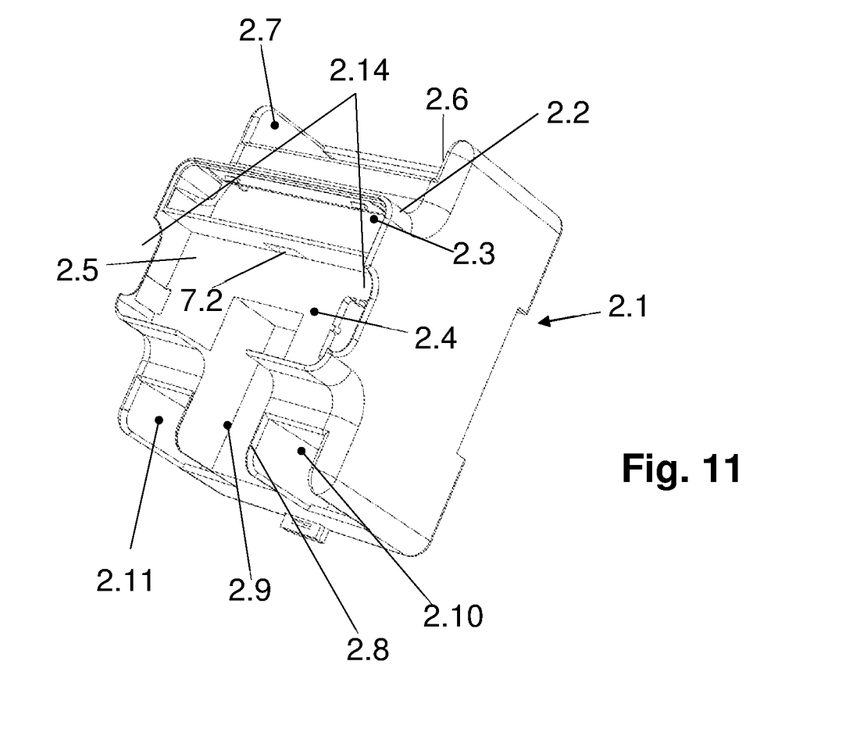
FIG. 11 represents a front perspective view of the second casing.
Figure 12:
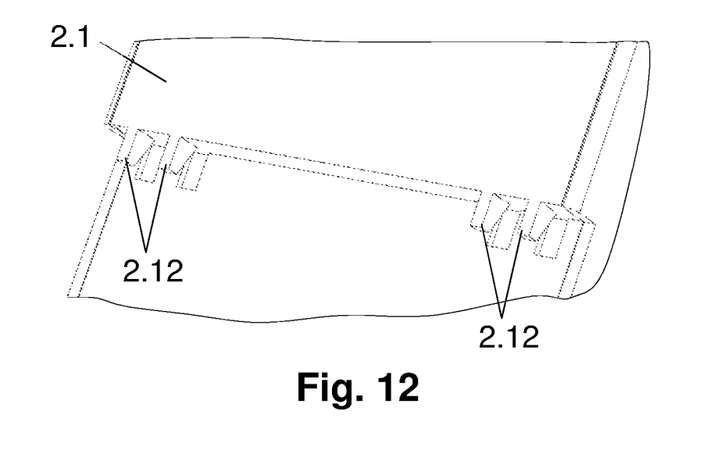
FIG. 12 represents a rear perspective view of a detail of the second casing.

The communication module (1) comprises a first casing (1.2), represented as two halves in FIG. 1, composed of an upper body (1.3), as shown in FIGS. 1, 4 and 5, with a first front wall (1.4) and a first rear wall (1.5) from which at least ten pins (3.1) of the bus connector (3) project, FIGS. 5 and 6, and a lower body (1.6) with a second front wall (1.7) having a first recess (1.8) in which the communications bus (1.1) is inserted, FIG. 4, and a second rear wall (1.9), so that the first front wall (1.4) is further forward than the second front wall (1.7) with respect to a user, and the first rear wall (1.5) is also further forward than the second rear wall (1.9) with respect to the user, the application module (2) comprising a second casing (2.1), represented as a body with a cover in FIG. 1, with a first protrusion (2.2) comprising a second recess (2.3) and a third recess (2.4), as shown in FIGS. 1 and 10, with a third front wall (2.5) from which a receiving connector (3.2) for the bus connector pins (3) projects, FIG. 1, a fourth front wall (2.6) having a centered fourth recess (2.7), FIGS. 1 and 11, which includes first electrical connection terminals (4), FIG. 1, a fifth front wall (2.8) having a fifth centered recess (2.9) and respective sixth (2.10) and seventh recesses (2.11), these sixth (2.10) and seventh recesses (2.11) including second (5) and third terminals (6) respectively, at least a first projection (2.12) facing a second projection (2.13), both projections (2.12, 2.13) being separated at approximately the width of the rail on which the device can be placed. It is common for each first projection (2.12) to be arranged paired and close to another, and also to arrange two pairs of first projections (2.12), as shown in FIGS. 3 and 12. For better placement and removal, as is known, some of the projections (2.12.2.13) are retractable, for example being sliding and with a return spring, as shown in the figures for the second projection (2.13).

The position of the first front wall (1.4) with respect to the second front wall (1.7) creates a step in the outer surface of the first casing (1.2) which causes the first recess (1.8) into which the communications bus (1.1) is inserted to be behind the most protruding surface of the device, and therefore, at a distance away from a possible electrical cabinet cover in which the rail with the device is situated, thus increasing the safety of the connection.

In use, FIG. 2, when the ten pins (3.1) of the bus connector (3) are introduced in the receiving connector (3.2) the upper body (1.3) is introduced in the third recess (2.4) and the lower body (1.6) in the fifth recess (2.9), and the first casing (1.2) is joined to the second casing (2.1) by means of securing means (7).

A detail of the explained embodiment is that the securing means (7) are at least one flange (7.1) arranged in the first casing (1.2), FIGS. 5 and 6, which engages in a hollow (7.2) arranged in the second casing (2.1), FIG. 11. This creates a simple and non-permanent attachment.

Another detail of the explained embodiment is that the flange (7.1) in the first casing (1.2) is arranged in the upper body (1.3) and the hollow (7.2) in the second casing (2.1) is arranged in the third recess (2.4), FIGS. 5 and 11. This configuration can be helped by respective lateral extensions (1.11) in the upper body (1.3) of the first casing (1.2), FIG. 4, which helps the extraction thereof with the thumb and index finger of one hand, also lateral hollows (2.14), FIG. 11, can be added in correspondence with said lateral extensions (1.11) to facilitate finger insertion.

Another detail of the explained embodiment is that each of the first (4), second (5) and third terminals (6) is a module insertable in each of their corresponding recesses: fourth (2.7), sixth (2.10) and seventh recess (2.11), FIG. 1. This configuration makes the terminals (4, 5, 6) very practical during installation or replacement. Similarly and inherently, being included in their recesses (2.7.2.10.2.11) they cause each terminal (4, 5, 6) to be insulated from its adjacent element by the walls of each corresponding recess (2.7, 2.10, 2.11), thereby protecting each terminal (4, 5, 6) from possible electrical contacts.

Preferably, the communication module (1) has a first LED indicator (1.12) and a first push-button (1.13), which allow the user to interact and parameterise some functions of the device, FIG. 4. Similarly, the application module (2) also has at least one second LED indicator (2.15) and a second push-button (2.16), FIG. 2, integrated in a strip (2.17) insertable in the second recess (2.3); in this embodiment, a front panel with eight of each of them is shown, for example, to control eight lighting points, so that the number will depend on each specific application.

Figure 7:
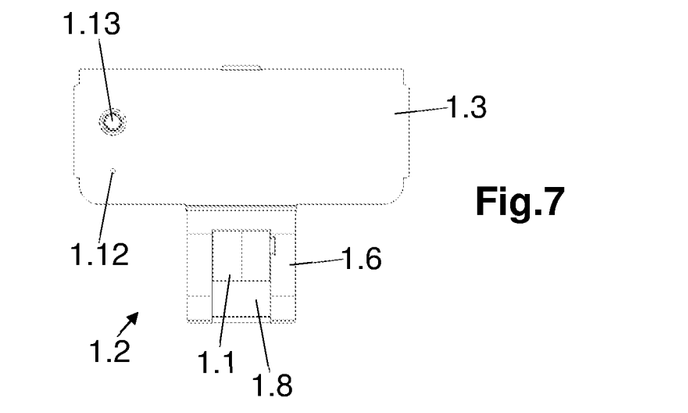
FIGS. 7 to 9 represent front views of the first casing with different communication buses.
Figure 8:
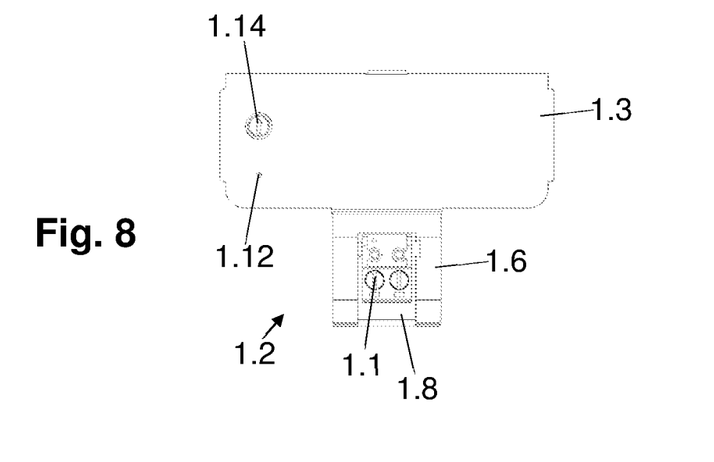
Figure 9:
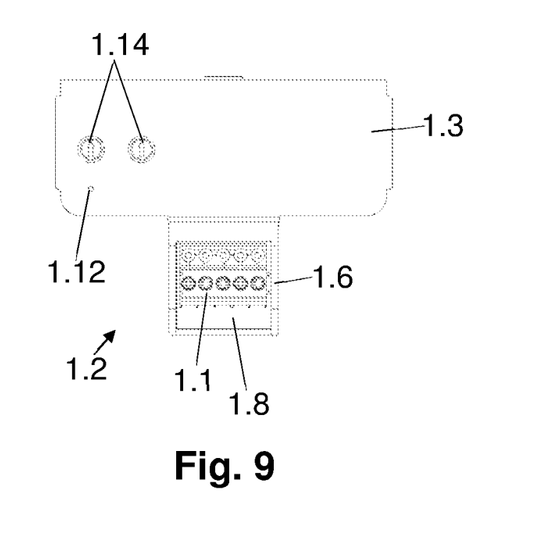

Advantageously, the first recess (1.8) is adapted for receiving the communications bus (1.1) according to one of the protocols selected from among KNX, C3, C4 and BACnet as shown respectively in FIGS. 7 to 9.

Specifically, for KNX and C3/C4, FIGS. 7 and 8, the same first recess (1.8) serves the purpose. For KNX, FIG. 7, the first programming push-button (1.13) and the first status LED indicator (1.12) are incorporated as a user interface, while for C3/C4, FIG. 8, a rotary selector (1.14) is incorporated for address assignment and a first status LED (1.12) indicator.

On the other hand, for BACnet, FIG. 9, the first recess (1.8) is larger than the previous one, since it goes to five terminals from two. This is due to the insurmountable differences that exist in terms of the user interface. The configuration for BACnet incorporates two rotary selectors (1.14) for address assignment, a first status LED indicator (1.12), and a "DIP switch"-type double selector (1.15), FIG. 10, with which to adjust the transmission speed.

The invention claimed is:

1. A rail-mounted building automation device comprising a communication module with a communications bus of the device, an application module that implements the functionality of the device, and a bus connector between the two modules, characterised in that said bus connector is for power supply and data transfer, the communication module comprising a first casing composed of an upper body with a first front wall and a first rear wall from which at least ten pins of the bus connector project, and a lower body with a second front wall having a first recess in which the communications bus is inserted and a second rear wall, so that the first front wall is further forward than the second front wall with respect to a user, and the first rear wall is also further forward than the second rear wall with respect to the user, the application module comprising a second casing with a first protrusion comprising a second recess and a third recess with a third front wall from which a receiving connector for a plurality of bus connector pins projects, a fourth front wall having a fourth centered recess that includes first electrical connection terminals, a fifth front wall having a fifth centered recess and respective sixth and seventh recesses, these sixth and seventh recesses including second and third terminals respectively, at least a first projection facing a second projection, both projections being separated at approximately a width of the rail on which the device can be placed, in use when the ten pins of the bus connector are introduced in a receiving connector the upper body is introduced in the third recess and the lower body in the fifth recess and the first casing is joined to the second casing by securing means.

2. The Device according to claim 1, wherein the securing means are at least one flange arranged in the first casing that engages in a hollow arranged in the second casing.

3. The Device according to claim 2, wherein the flange in the first casing is arranged in the upper body and the hollow in the second casing is arranged in the third recess.

4. The Device according to claim 1, wherein each of the first, second and third terminals is a module insertable in each of corresponding recesses, respectively: fourth, sixth and seventh recess.

* * * * *